HALL GENERATORS OF INCREASED SENSITIVITY

Filed May 2, 1956

United States Patent Office 2,814,015

Patented Nov. 19, 1957

2,814,015

HALL GENERATORS OF INCREASED SENSITIVITY

Friedrich Kuhrt, Nurnberg, Germany, assignor to Siemens-Schuckertwerke Aktiengesellschaft, Berlin-Siemensstadt and Erlangen, Germany, a corporation of Germany

Application May 2, 1956, Serial No. 582,206

Claims priority, application Germany May 11, 1955

17 Claims. (Cl. 323—63)

Figure 1:
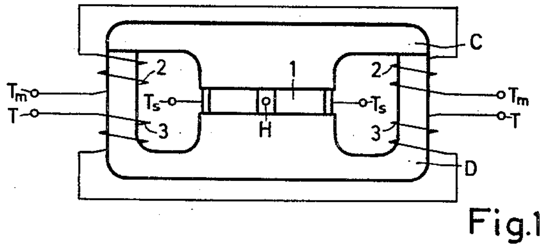

My invention relates to electromagnetic Hall-voltage devices in which a resistance body, traversed by electric current, is subjected to a magnetic field transverse to the current flow is provided with electrodes that are spaced from each other in a direction transverse to the current flow as well as to the direction of the magnetic field. It is known that various conducting and semiconducting substances, when used as a resistance body in such devices, are suitable for producing across the electrodes a voltage, the so-called Hall voltage, which varies in dependance upon the magnetic field strength or the magnitude of the electric current or both, and which thus can be used for sensing, measuring or indicating any physical magnitude that varies in proportion or other relation to the magnetic induction. For instance, an electric current or the variation of an air gap in the magnetic field can thus be measured or responded to.

It is an object of my invention to increase the sensitivity of such Hall-voltage devices far beyond the degree heretofore obtainable. Another object is to increase the obtainable Hall-voltage power output to such an extent as to make such devices suitable as current generators for industrial control and regulating purposes or similar requirements requiring the supply of variable current to a current-consuming load.

Toward these ends, and in accordance with a feature of my invention, I provide a Hall-voltage device of the type above mentioned with an additional field winding which is poled in cumulative and hence amplifying relation to the primary magnetic field of the device, and I connect the additional field winding to a voltage which is proportional to the magnetic field and which is taken from one of the electric circuits of the Hall-voltage producing resistance body or Hall plate.

Preferably suitable as a resistance body or Hall plate in devices according to the invention are substances which possess a carrier mobility of at least 6000 cm.$^2$/volt second. Such extreme carrier mobilities are known to occur with resistance material consisting of semiconducting compounds, for instance those of the type $A_{III}B_V$ formed of an element A from the third group of the periodic system with an element B from the fifth group of the periodic system. Particularly suitable among the compounds of the type $A_{III}B_V$ are those of one of the elements boron, aluminum, gallium and indium with one of the elements nitrogen, phosphorus, arsenic and antimony (BN, BP, BAs, BSb, AlN, AlP, AlAs, AlSb, GaN, GaP, GaAs, GaSb, InN, InP, InAs, InSb). Indium arsenide (InAs) and indium antimonide (InSb) have carrier mobilities above 20,000 cm.$^2$/volt second. Such semiconducting compounds, as compared with the previously known Hall-voltage producers made from bismuth or from semiconducting elements such as germanium, have the advantage that the Hall voltage can be applied to a power consuming load. That is, such devices permit drawing an appreciable amount of current from the Hall electrodes without breakdown of the Hall voltage, and the Hall-electrode circuits of such devices can be directly connected to loads of relatively small input impedance such as electromagnetic relays or magnetic amplifiers. For that reason the Hall-voltage producers of this kind are properly called "Hall generators." They make it possible, by virtue of the Hall plate of the above-mentioned high carrier mobility, to directly use a Hall voltage for energizing a field amplifying winding as required by the invention.

The Hall voltage for energizing the additional amplifying winding of the device may be supplied from a Hall plate which is located in, or provided with, a separate magnetic field whose magnitude changes in proportion to, or together with, the primary magnetic field. However, according to a preferred feature of my invention, two Hall plates are disposed in a single magnetic field, namely the same field that is the cause of the Hall voltage used for energizing the field-amplifying winding. One of the Hall plates has Hall electrodes connected with the additional amplifying winding, whereas the Hall electrodes of the other Hall plate are connected to an output circuit to supply the voltage used for the desired sensing, measuring or control purpose.

According to another feature of my invention, a single Hall plate is disposed in the magnetic field but is provided with two separate pairs of Hall electrodes, one pair being used for energizing the field amplifying winding whereas the other pair of electrodes is available for sensing, measuring or other output purposes.

According to still another feature of my invention, the output Hall voltage of a single Hall plate, provided with only one pair of Hall electrodes, is used for output purposes as well as for energizing the field-amplifying additional winding. More specifically, the field amplifying winding is connected to the Hall voltage in parallel relation to the instrument or other device which is to respond to that Hall voltage.

In each case the sensitivity of response or indication of the Hall generator is greatly increased by an amplifying effect which may be considered to involve a feedback coupling.

Figure 2:
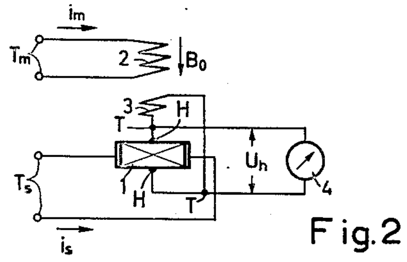
Figure 3:
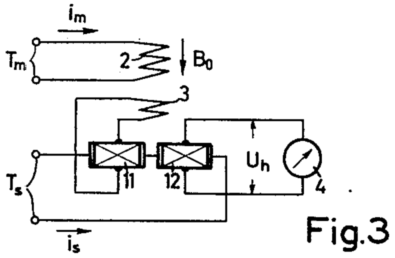
Figure 4:
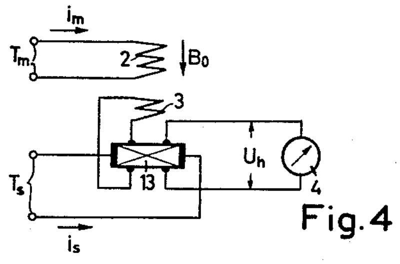

The above-mentioned and other objects and features of my invention will be more fully apparent from the following description in conjunction with the embodiments illustrated on the drawing in which:

Fig. 1 shows schematically the magnetic field system and Hall plate of a Hall generator according to the invention, and Figs. 2, 3 and 4 respectively show three different circuit diagrams of such Hall generators.

According to Fig. 1, the device is provided with a magnetic core system composed of two parts C and D which form respective pole faces between which a Hall plate 1 is disposed. The core system is provided with two windings 2 and 3. The winding 2 is energized from input terminals $T_m$ by a variable signal current $i_m$ (Fig. 2) and produces a magnetic field in the gap in which the Hall plate 1 is located. The field winding 3 is energized from terminals T in proportion to the field strength or magnetomotive force of winding 2 as will be explained below. The winding 3 is poled in cumulative relation to the winding 2 so that it amplifies the magnetic field to which the Hall plate 1 is subjected. The Hall plate 1 is provided with terminals which are supplied with current $i_s$ (Fig. 2) from terminals $T_s$. The Hall plate is further equipped with Hall electrodes H which are located midway between the current supply terminals and define an electrode axis perpendicular to the current axis of the supply terminals. It will be recognized that these two axes define a geometric plane perpendicular to the direction of the magnetic field in the Hall plate 1.

In operation, the Hall plate 1 is traversed by the current $i_s$ flowing between the terminals $T_s$ while the magnetizing current $i_m$ flowing through winding 2 between terminals $T_m$ produces a magnetic field denoted by the arrow $B_0$ in Fig. 2. The Hall voltage $U_h$ occurring between the two electrodes H is measured by an instrument 4. The same voltage $U_h$ energizes the additional winding 3.

For otpimum power matching, the Hall voltage under load is determined by the equation $$U_h=\frac{R_H}{2d}\cdot i_s\cdot B_0 \qquad (1)$$

wherein $d$ denotes the thickness of the semiconducting Hall plate. Applied to the Hall generator with feedback coupling according to Fig. 2, the equation assumes the form:

$$U_h=\frac{R_h}{2d}\cdot i_s\left(B_0+\mu_0\cdot\frac{w}{\delta}\cdot i_h\right) \qquad (2)$$

wherein $\delta$ is the width of the air gap (which, as apparent from Fig. 1 is only slightly different from the thickness $d$ of the Hall plate), $i_h$ is the Hall current flowing between the Hall electrodes H, and $w$ is the number of turns of the additional winding 3. If, in the Equation 2, the Hall current is expressed as $$i_h=\frac{U_h}{R_w} \qquad (3)$$

with $R_w$ denoting the resistance of the additional winding, then the Hall voltage $U_h$ of the feedback-coupled Hall generator is expressed by $$U_h=\frac{\frac{R_H}{2d}\cdot i_s\cdot B_0}{1-\mu_0\frac{R_h\cdot w\cdot i_s}{2R_w\cdot d\cdot\delta}} \qquad (4)$$

As can be recognized from Equation 4, an appreciable increase in sensitivity can only be expected if the term $$\mu_0\cdot\frac{R_H\cdot w\cdot i_s}{2R_w\cdot d\cdot\delta}$$

is approximately equal to unity. Without considerably or excessively increasing the control current $i_s$, this condition can be satisfied only if the width $\delta$ of the air gap and the thickness $d$ of the semiconductor Hall plate amount to only fractions of one millimeter. For this reason, it is preferable not to insert any separate insulating material between the Hall plate and the adjacent pole faces of the field structure (Fig. 1) but to make the pole pieces, at least in their respective surface zones, of ferritic material which is magnetizable but not electrically conductive. Preferably the semiconducting Hall plate is thus directly imbedded in or between the ferrite material so that the width of the air gap is approximately equal to the thickness $d$ of the semiconductor body.

For some purposes, the embodiment illustrated in Fig. 2 is disadvantageous in that a share of the power output of the Hall generator is consumed for energizing the amplifying feedback winding 3. Also, if the signal current $i_m$ varies very rapidly, the voltage appearing in the output circuit of the Hall generator is not the pure Hall voltage but has also a component which is caused by the inductive effect of winding 2 upon the winding 3 and is proportional to the rate of current change $di_m/dt$. Both undesired effects, however, can be eliminated by providing the air gap of the magnetizing system with two Hall plates as is exemplified by the embodiment illustrated in Fig. 3.

In Fig. 3 the two Hall plates disposed within the same air gap of a device otherwise in accordance with Fig. 1, are denoted by 11 and 12. When providing the magnet system with ferrite material at the pole faces, both Hall plates may be disposed side by side between the two adjacent layers or plates of ferrite material. The Hall plate 11 provides the Hall voltage for energizing the feedback winding 3. The other Hall plate 12 generates the Hall voltage which appears in the output circuit of the device and, as shown, is connected to the measuring instrument 4. Both Hall plates 11, 12 are connected in series with each other in the circuit of the control current $i_s$ so that both are traversed by the same amount of current.

The advantages obtained by the device according to Fig. 3 are also afforded by the modification illustrated in Fig. 4 which requires only one Hall plate in a device otherwise similar to the one shown in Fig. 1. According to Fig. 4, the Hall plate 13 has two pairs of Hall electrodes spaced from each other in the direction of current flow between the current supply terminals. One pair of Hall electrodes is connected with the additional winding 3 for energizing the amplifying feedback circuit. The other pair of Hall electrodes supplies output voltage to the load or instrument 4. In comparison with the embodiment of Fig. 2, the one shown in Fig. 3 has the further advantage of a simplified design and of a smaller resistance in the control circuit of current $i_s$.

By virtue of the invention, as exemplified by the above-described embodiments, a considerable increase in sensitivity of the Hall generators is achieved so that such devices are suitable for sensing and indicating purposes as well as for control and regulating systems that require high sensitivity of response. By properly rating the degree of feedback, such Hall generators can also be made self-exciting which makes them applicable, for instance, for operation as oscillators in alternating current circuits.

It will be understood by those skilled in the art, upon a study of this disclosure, that my invention permits of various modifications and may be embodied in devices other than those particularly illustrated and described, without departing from the essence of my invention and within the scope of the claims annexed hereto.

I claim:

1. A Hall generator, comprising semiconductor compound body means having a carrier mobility of at least 6000 cm.²/volt second, said body means having terminals defining a current axis and having Hall electrode means on an electrode axis transverse to the current axis, a signal-excited first field winding having in said body means a magnetic field transverse to both said axes, said Hall generator having a voltage determined by said field, a second magnetic field winding connected across said Hall electrode means to be excited by said field-determined voltage and having in said body means a field directed and poled in cumulative relation to said field of said first winding.

2. A Hall generator, comprising semiconductor compound body means having a carrier mobility of at least 6000 cm.²/volt second, said body means having terminals defining a current axis and having Hall electrode means defining an electrode axis transverse to the current axis, a signal-excited first field winding having in said body means a magnetic field transverse to both said axis, said Hall generator having a Hall-voltage circuit connected across said Hall electrode means to provide a voltage determined by said field, a second magnetic field winding connected in said Hall-voltage circuit and having a field directed and poled in cumulative relation to said field of said first winding, the second winding being energized by a Hall voltage generated by said body means which is proportional to the magnetic field traversing said body means.

3. A Hall generator, comprising magnetic field structure having a pole gap, two field windings on said structure to jointly produce a field through said gap, Hall-plate means comprising a semiconductor compound having a carrier mobility of at least 6000cm.²/volt second, said plate means being disposed in said gap and having current terminals and Hall electrode means, a current-supply circuit connected to said terminals to pass current through said Hall-plate means, a separately excited field circuit including one of the windings, said other of said windings being connected across said Hall-electrode means to be directly excited by the Hall voltage generated by the Hall-plate, and an output circuit connected to said Hall-electrode means, said two windings being cumulatively poled as regards their effects upon said output circuit.

4. A Hall generator, comprising magnetic field structure having a pole gap, two field windings on said structure to jointly produce a field through said gap, a Hall device comprising body means of semiconductor compound having a carrier mobility of at least 6000 cm.²/volt second, said body means being disposed in said gap and having a pair of current terminals and a pair of Hall electrodes, a current-supply circuit connected to said terminals to pass current through said body means, a separately excited field circuit including one of said windings, the other of said windings being connected to said Hall electrodes to be directly excited by the Hall voltage generated by the body means, and an output circuit having a load connected across said Hall electrodes in parallel with said other winding, said two windings being cumulatively poled as regards their magnetic effects upon said output circuit.

5. A Hall generator, comprising magnetic field structure having a pole gap, two field windings on said structure to jointly produce a field through said gap, two Hall bodies in said gap, each body having a pair of current terminals and a pair of Hall electrodes, a current-supply circuit connected to said terminal pairs of both said Hall bodies to pass current therethrough, a separately excited field circuit including one of said windings, the other of said windings being connected to said Hall electrodes of one of said bodies to be excited by the Hall voltage generated by the said body, and an output circuit connected across said Hall electrodes of the other of said bodies, said two windings being cumulatively poled as regards their effects upon said output circuit, each Hall body comprising a semiconductor compound having a carrier mobility of at least 6000 cm.²/volt second.

6. A Hall generator, comprising magnetic field structure having a pole gap, two field windings on said structure to jointly produce a field through said gap, a Hall body in said gap having a pair of current terminals and having two pairs of Hall electrodes spaced from each other between the terminals of said terminal pair, a current-supply circuit connected to said terminals to pass current through said body, a separately excited field circuit including one of said windings, the other of said windings being connected across one of said pairs of Hall electrodes to be excited by the Hall voltage of said plate, and an output circuit connected across said other pair of Hall electrodes, said two windings being cumulatively poled as regards their effects upon said output circuit, the Hall body comprising a semiconductor compound having a carrier mobility of at least 6000 cm.²/volt second.

7. The apparatus defined in claim 5 in which the current-supply circuit passes current serially through the two Hall bodies.

8. The apparatus defined in claim 1 in which the carrier mobility is not less than about 20,000 cm.²/volt second.

9. The apparatus defined in claim 2 in which the carrier mobility is not less than about 20,000 cm.²/volt second.

10. A Hall generator, comprising semiconductor compound body means having a carrier mobility of at least 6000 cm.²/volt second, said body means having terminals defining a current axis and having Hall electrode means defining an electrode axis transverse to the current axis, a signal-excited first field winding having in said body means a magnetic field transverse to both said axes, said Hall generator having a Hall-voltage circuit connected across said Hall electrode means to provide a voltage determined by said field, a second magnetic field winding connected in said Hall-voltage circuit and having a field directed and poled in cumulative relation to said field of said first winding, the second winding being energized by a Hall voltage generated by said body means which is proportional to the magnetic field traversing said body means, the semiconductor being taken from the group consisting of compounds of the elements boron, aluminum, gallium, and indium with an element of the group consisting of nitrogen, phosphorus, arsenic, and antimony.

11. The apparatus defined in claim 2 in which the semiconductor is indium arsenide having a carrier mobility of at least 20,000 cm.²/volt second.

12. The apparatus defined in claim 2 in which the semiconductor is indium having a carrier mobility of at least 20,000 cm.²/volt second.

13. A Hall voltage producing device having means for increasing the sensitivity of response thereof, the device comprising a resistance body made of a semiconductor compound having a carrier mobility greater than 6000 cm.²/volt second, circuit means for passing current through the body, a first magnetic field winding impressing a magnetic field across the resistance body to generate a Hall voltage transversely thereof, the means for increasing the sensitivity comprising an additional magnetic field winding impressing a magnetic field across the resistance body, the additional winding being energized by, and its field strength being determined by, a Hall voltage generated by said device.

14. An oscillator comprising the device defined in claim 13, for operation in an alternating current circuit, the additional winding providing the degree of feedback required to make the device self-exciting.

15. The apparatus defined in claim 13, and circuit means connected to a low impedance load, the Hall voltage generated by the semiconductor body being impressed across the load, the said additional winding being in parallel with the load.

16. The apparatus defined in claim 13, and circuit means connected to a low impedance load, the Hall voltage generated by the semiconductor body being impressed across the load, the said additional winding being in parallel with the load, the semiconductor being taken from the group consisting of compounds of the elements boron, aluminum, gallium, and indium with an element of the group consisting of nitrogen, phosphorus, arsenic, and antimony.

17. A Hall generator, comprising semiconductor compound body means having a carrier mobility of at least 6000 cm.²/volt second, said body means having terminals defining a current axis and having Hall electrode means defining an electrode axis transverse to the current axis, a signal-excited first field winding having in said body means a magnetic field transverse to both said axes, said Hall generator having a Hall-voltage circuit connected across said Hall electrode means to provide a voltage determined by said field, a second magnetic field winding connected in said Hall-voltage circuit and having a field directed and poled in cumulative relation to said field of said first winding, the second winding being energized by a Hall voltage generated by said body means which is proportional to the magnetic field traversing said body means, and circuit means connected to a low impedance load, the Hall voltage generated by the semiconductor body means being impressed across the load, the second winding being connected in parallel with the load, the semiconductor being taken from the group consisting of compounds of the elements boron, aluminum, gallium, and indium with an element of the group consisting of nitrogen, phosphorus, arsenic, and antimony.

References Cited in the file of this patent

UNITED STATES PATENTS

| | | |
|---|---|---|
| 1,778,795 | Craig | Oct. 21, 1930 |
| 1,825,855 | Craig | Oct. 6, 1931 |
| 2,512,317 | Edwards et al. | June 20, 1950 |
| 2,649,574 | Mason | Aug. 18, 1953 |